United States Patent [19]

Caropreso et al.

[11] 3,990,908

[45] Nov. 9, 1976

[54] DESIZING GLASS FABRIC WITH SODIUM CARBONATE PEROXIDE DESIZING SOLUTIONS

[75] Inventors: Frank E. Caropreso, Hightstown; John M. Plutar, Princeton, both of N.J.

[73] Assignee: FMC Corporation, Philadelphia, Pa.

[22] Filed: Mar. 19, 1975

[21] Appl. No.: 559,699

[52] U.S. Cl. .................. 134/2; 8/111; 8/138; 65/30 R; 65/65 R; 134/3; 134/19; 134/30; 134/38

[51] Int. Cl.² .............. C03C 25/00; B08B 3/10; B08B 3/08

[58] Field of Search .......... 134/2, 19, 30, 38, 3; 65/65 R, 30 R; 8/138, 111, 8

[56] References Cited

UNITED STATES PATENTS

| | | |
|---|---|---|
| 2,173,040 | 9/1939 | Muller ................................ 8/138 |
| 2,730,428 | 1/1956 | Lindner ........................... 8/111 X |
| 3,148,019 | 9/1964 | Gallagher et al. ................ 8/111 |
| 3,682,583 | 8/1972 | Kravetz et al. ................... 8/138 |
| 3,740,188 | 6/1973 | Sitver et al. ...................... 8/111 |
| 3,765,834 | 10/1973 | Sitver et al. ...................... 8/111 |
| 3,796,601 | 3/1974 | Kindron et al. .................. 134/2 |

FOREIGN PATENTS OR APPLICATIONS

| | | |
|---|---|---|
| 46-23790 | 7/1968 | Japan ................................ 8/111 |

*Primary Examiner*—S. Leon Bashore
*Assistant Examiner*—M. Steven Alvo

[57] ABSTRACT

Desizing glass fabric by dampening sized glass fabric with an aqueous desizing solution containing 1.0 to 18.0 g/l sodium carbonate peroxide to provide about 0.03% to about 0.50% sodium carbonate peroxide on the fabric based on the weight of the dry fabric being dampened, removing the dampened fabric from the aqueous desizing solution heating the dampened fabric, and washing the fabric to remove desizing solution and size.

7 Claims, No Drawings

DESIZING GLASS FABRIC WITH SODIUM CARBONATE PEROXIDE DESIZING SOLUTIONS

This invention relates to a process for desizing glass fabric employing a wet chemical treatment process.

In the production of glass fabrics it is conventional processing procedure to lubricate the fibers when the fibers are to be subjected to textile processing with a suitable sizing material to minimize the effects of fiber-fiber friction and to hold the individual filaments together. Suitable sizing materials include dextrinized starch, gelatin, polyvinyl alcohol, hydrogenated vegetable oils, and nonionic or ionic detergents, which materials remain on the finished glass fabric after textile processing. The presence of the sizing materials on the finished glass fabric, however, prevents effective adhesion between the glass fabric and other finishing materials such as coatings, resins, and dyes. Accordingly, it is necessary to remove the sizing that was applied to the glass fibers during the manufacture of the glass fabric in order to obtain satisfactory adhesion between the fabric and these finishing materials.

The two principal methods for removing size from glass fabric have involved thermal treatment, and chemical extraction. Two thermal treatment methods are exemplified in U.S. Pat. Nos. 2,608,499 and 3,012,845. These methods involve heat cleaning the glass fabric at high temperatures, usually about 650° C, in order to burn away the sizing material. While thermal desizing methods produce a clean glass fabric surface, the use of high temperatures results in a substantial loss of glass fabric tensile strength and often discolors or streaks the glass fabric due to carbon deposition.

Numerous chemical extraction methods using various chemicals to remove the sizing material prior to coronization have been proposed. The chemicals proposed include peroxydisulfates and peroxydiphosphates (U.S. Pat. Nos. 3,796,601 and 3,726,800); persulfuric acid or sodium persulfate (Japanese Pat. No. 72/21,909 and U.S. Pat. No. 2,173,040); aluminum phosphates (Japanese Pat. No. 73/92,690); hot trichloro- or perchloroethylene (British Pat. No. 825,507); sodium azide (U.S. Pat. No. 3,762,897); and sodium hypochlorite (U.S. Pat. No. 3,671,179). It is apparent from all of these prior art methods that the prior art has been striving for years to develop an efficient and effective glass fabric desizing process.

An effective and efficient low temperature, wet chemical method for desizing glass fabric has been unexpectedly discovered which comprises dampening sized glass fabric with an aqueous desizing solution having a pH of about 4 to about 10 at a temperature of about 10° C to about 70° C for about 1 second to about 120 seconds, wherein said desizing solution contains 1.0 to 18.0 g/l sodium carbonate peroxide to provide about 0.03% to about 0.50% sodium carbonate peroxide on the fabric based on the weight of the dry fabric being dampened, removing the dampened glass fabric from the aqueous desizing solution, heating and maintaining the dampened fabric at a temperature from 70° C to the boiling temperature of the solution on the fabric for about 5 seconds to about 240 seconds, and washing the fabric to remove the desizing solution and size.

It was completely unexpected to find that sodium carbonate peroxide solutions containing 1.0 to 18.0 g/l sodium carbonate peroxide which provide about 0.03% to about 0.5% sodium carbonate peroxide on the fabric, when employed according to the process of this invention, could effectively and efficiently desize glass fabric at these extremely low sodium carbonate peroxide concentrations, since desizing solutions containing an equivalent amount of hydrogen peroxide and sodium carbonate, when employed under identical conditions, cause poor and erratic size removal. It was unexpected because it is well known that sodium carbonate peroxide ($2Na_2CO_3 \cdot 3H_2O_2$) is essentially an addition product of hydrogen peroxide and sodium carbonate and that solutions containing sodium carbonate peroxide were presumed to have the same properties as solutions containing a corresponding amount of sodium carbonate and hydrogen peroxide. Besides being unexpected, the process of the invention removes up to 90% of the sizing materials from the glass fabric without causing deterioration and disintegration of the glass fabric whereas deterioration and disintegration of glass fabric has been heretofore obtained when employing hot solutions of weak alkali solutions or cold solutions of strong alkali solutions.

In the process of this invention, sized glass fabric is dampened with an aqueous desizing solution containing sufficient amounts of sodium carbonate peroxide to provide about 0.03% to about 0.50% sodium carbonate peroxide on the fabric based on the weight of the dry fabric being dampened. This amount of sodium carbonate peroxide contacts the glass fabric when the aqueous desizing solution contains 1.0 to 18.0 g/l sodium carbonate peroxide in water. The aqueous desizing solution preferably contains 3.5 to 10.0 g/l sodium carbonate peroxide to provide about 0.1% to about 0.3% sodium carbonate peroxide on the fabric based on the weight of the dry fabric being dampened. Desizing solutions having sodium carbonate peroxide concentrations below 1.0 g/l cause erratic size removal and accordingly are not effective desizing solutions in a commercial desizing process. Desizing solutions having sodium carbonate peroxide concentrations above 18 g/l are not employed since these solutions are only as effective as hydrogen peroxide desizing solutions.

The aqueous desizing solution must have a pH from about 4 to about 10 and preferably about 7 to about 9 to prevent decomposition of the glass fibers. At pH values from about 4 to about 10 the glass fabric is not degraded to any appreciable extent by the desizing solution and size removal is very rapid and complete. Conventional additives for adjusting the pH of the aqueous desizing solution, such as sulfuric acid and sodium hydroxide or other suitable mineral acids or alkali are employed.

The glass fabric is dampened with the aqueous desizing solution at a temperature of about 10° C to about 70° C for about 1 second to about 120 seconds, and is preferably dampened at temperatures from about 15° C to about 30° C for about 5 seconds to about 60 seconds. Temperatures above 70° C or times longer than 120 seconds are not employed since size removal is not significantly enhanced and sodium carbonate peroxide decomposition is increased.

Dampening of the glass fabric with the aqueous desizing solution may optionally be performed in the presence of from 0.025% to 2% of a wetting agent. Wetting agents such as Triton X-100 as well as other nonionic and anionic wetting agents may be used. Example of wetting agents include alkylphenolethylene oxide condensates in which the alkyl substituent may vary from $C_8$ through $C_{18}$ carbon atoms and the number of moles of condensed ethylene oxide units varies from 1 to 100 per mole of alkyl, such as isooctylphenylpoly(oxyethylene)ethanol or dodecylphenylpoly(oxyethylene)methylether; poly(oxyethylene)thioethers; propylene oxide-ethylene oxide condensates such as are described in U.S. Pat. No. 2,674,619; fatty acid alkanolamides in which the fatty acid constitute may vary from $C_8$ through $C_{18}$ carbon atoms, such as lauric acid alkanolamide; alkylpoly(oxyethylene)ethanols in which the alkyl radical may vary from $C_8$ through $C_{18}$ carbon atoms and the moles of condensed ethylene oxide may vary from 1 to 100 per mole of alkyl, such as tridecylpoly(oxyethylene)ethanol, or the ethylene oxide condensates of stearyl alcohol containing about 10 moles of ethylene oxide per mole of stearyl alcohol; and the polyhydroxyalkyl fatty acid esters such as glycerol monooleate or sorbitan stearate. Dampening of the glass fabric in the presence of a wetting agent gives better results than dampening in the absence of a wetting agent. The wetting agent apparently brings the water molecules into intimate contact with the size on the glass fabric and keeps the water molecules there until the size is softened.

The glass fabric is dampened by contacting the fabric with the aqueous desizing solution according to conventional procedures, for example, the fabric is immersed in a bath of the desizing solution, removed from the bath and squeezed or otherwise processed to remove excessive solution. Other procedures for dampening fabric may also be employed which procedures are well known to those skilled in the fabric treating art.

After the dampened glass fabric is removed from the desizing solution, the dampened glass fabric is contacted at about 100° C with steam at ambient pressure for about 5 seconds to about 240 seconds. Size removal is not improved with longer contacting times and accordingly contact times above about 240 seconds are not necessary. Temperatures somewhat lower than 100° C, that is down to 70° C, can be employed although processing time as described herein increases as the temperature decreases below 100° C. Temperatures above 100° C to the boiling temperature of the solution on the fabric can be employed, and are obtained by performing the process in a conventional pressure type vessel, such as Vapor-Lock. Steaming the dampened glass fabric under these conditions is necessary to complete the desizing reaction between sodium carbonate peroxide and the sizing materials, thereby rendering the sizing materials water soluble.

Washing the fabric after treatment is essential to remove the solubilized size from the glass fabric. Washing not only dissolves the soluble materials but it also physically removes much of the remaining insoluble size. Washing is usually done by rinsing the fabric with warm water, (35° – 99° C) with or without additives, by any of the numerous known methods for washing fabrics.

Following washing, the fabric is dried to remove excess moisture. The dried fabric can then be weave set or desized further if necessary by conventional coronization methods. Conventional coronization methods generally involve treating the glass fabric at about 650° C for 5 to 15 seconds. While glass fabrics are generally considered to have excellent resistance to the effects of heat over a wide temperature range, glass fabrics show a decrease in strength and flexibility when heated at temperatures above about 205° C. For example, at 370° C, glass filaments retain only about 50 percent of their original strength; at 538° C they retain about 25 percent of their original strength. By employing the wet chemical desizing process of this invention which removes over 90% of the sizing materials without a coronization treatment, an effective coronization treatment of the glass fabric is now possible by performing a coronization treatment for shorter periods of time or at lower temperatures without decreasing the strength or flexibility of the glass fibers.

An optional procedure which may be employed to improve size removal when using the low sodium carbonate peroxide concentrations recited herein is to pretreat the glass fabric with water or steam at a temperature of about 55° C to about 135° C for about 1 second to about 600 seconds prior to dampening the fabric with the aqueous desizing solution. Treatment of the sized glass fabric with water or steam causes the size adhering to the glass fabric to become softened and/or swelled making the subsequent removal of the size more effective and efficient by permitting good penetration of the desizing solution. Besides softening the size, this treatment effects an initial size removal by solubilizing some of the size.

The glass fabric when pretreated with water is preferably treated with water having temperatures of about 60° C to about 90° C for about 15 seconds to about 120 seconds prior to dampening the fabric with an aqueous desizing solution. Pretreatment with steam is preferably done by treating the glass fabric with steam at a temperature of at least 100° C for about 30 seconds to about 180 seconds prior to dampening the fabric with the aqueous desizing solution. Temperatures above 100° C can be obtained by performing the treatment step in a conventional pressure type vessel in which temperatures as high as about 135° C can be obtained. At these elevated temperatures, processing time is decreased and good desizing removal is achieved.

The glass fabric treatment with water is conveniently effected by passing the fabric through a conventional wash box or plurality of wash boxes. As the number of wash boxes employed is increased, size softening and subsequent size removal becomes more efficient. Generally, a greater number of wash boxes will be required when operating at lower temperatures. In addition, as the ratio of treatment water to glass fabric increases, size softening and subsequent size removal is also increased. Good results are obtained using a 20:1 parts ratio of water to fabric although higher or lower ratios can be employed.

The glass fabric treatment with steam is conveniently effected by passing the fabric through a conventional steamer. Steaming the glass fabric causes the size to soften so that the size can be subsequently easily penetrated and dissolved or removed. Steaming beyond 600 seconds does not increase size softening or subsequent size removal beyond that obtained in shorter steaming times.

Treatment of the glass fabric with water or steam prior to dampening with the aqueous desizing solution may optionally be performed in the presence of a wetting agent. Nonionic wetting agents such as Triton X-100 as well as other nonionic and anionic wetting agents heretofore described may be used to aid in the treatment process. Preferred concentration of wetting agent in the pretreatment solution is from 0.025% to 2% with about 0.13% particularly preferred.

The term glass fabric as used herein refers to textile fabrics made from glass fiber which fiber is spun from molten glass. There are many known methods of spinning fibers from glass such as the centrifugal, jet or rod drawing processes. Suitable glasses for the production of glass fibers include a wide range of materials which are made by fusing together one or more of the oxides of silicon, boron, or phosphorus with certain basic oxides such as sodium, potassium, magnesium or calcium oxide. Typical glasses used for producing glass fibers are known as type "E" glass (silicon silicate glass), and type "C" glass (borosilicate glass). The term glass fabric as used herein also refers to sized glass fibers which are used for making glass fabric.

The following examples are given to illustrate the invention, but are not deemed limiting thereof. All percentages given are based upon weight unless otherwise indicated.

Example 1

Process of the Invention - Runs 1 to 8

This Example demonstrates the use of sodium carbonate peroxide solutions to desize sized glass fabric in the presence and absence of a pretreatment step.

A sample of commercially sized "satin weave" glass fabric containing 1.5% removable size was cut into pieces measuring 6 inches by 10 inches, each weighing 12 to 15 grams. The size on the fabric contained a modified cornstarch and polyvinyl alcohol. The fabric pieces were dampened with the aqueous desizing solution by immersing the fabric pieces in 500 milliliters of an agitated aqueous desizing solution having a pH of 8 at about 25° C for one minute. The aqueous desizing solution contained various amounts of sodium carbonate peroxide as set forth in Table I and 1 g/l nonionic wetting agent. The dampened fabric pieces were then passed through manual rollers to remove excess desizing solution, and then steamed for two minutes in 100° C in a cylindrical shaped steam tube having a height of 36 inches and diameter of 6 inches. The fabric pieces were than placed on a 150 mesh sieve (U.S. Standard Size) and washed for 2 minutes with tap water at 70° C. The fabric pieces were air dried at 105° C to a constant weight, and then burned in a muffle furnace for 10 minutes at 615° C. From the difference in the sample weight before and after burning the weight percentage of residual size was calculated based upon the assumption that the loss of weight was due completely to the burning off of the residual size. The results are set forth in Table I.

Some of the pieces were pretreated with steam or hot water prior to dampening the glass fabric pieces with the aqueous desizing solution. The glass fabric pieces were pretreated with steam by saturating the pieces with an aqueous solution containing 1 g/l nonionic wetting agent at about 25° C, passing the pieces through manual rollers to remove excess solution, and then separately steaming the pieces for 2 minutes at about 100° C in a cylindrical shaped steam tube described heretofore. The glass fabric pieces were pretreated with hot water by placing the pieces in 500 milliliters of agitated tap water containing 1 g/l nonionic wetting agent at 70° C for 1 minute, and then passed through manual rollers to remove excess solution.

Example 2

Process of the Invention - Runs 9 and 10

This Example demonstrates the use of sodium carbonate peroxide solutions to desize different glass fabrics containing different amounts of size.

Samples of commercially sized glass fabrics containing different amounts of size were desized according to Example 1 with a steam pretreatment step. Fabric A was a tightly woven plain weave glass fabric containing 1.3% modified cornstarch and polyvinyl alcohol as the sizing material. Fabric B was a tightly woven plain weave glass fabric containing 1.9% modified cornstarch and polyvinyl alcohol as the sizing material. Fabric C was the loosely woven glass fabric described in Example 1 and treated according to Run 2. The results are set forth in Table II.

Table II demonstrates that desizing efficiency varies slightly with different fabric weaves and size concentrations. Size removal from Fabrics A and B were slightly less than the size removal from Fabric C probably because the tight weave of Fabrics A and B made it more difficult for the sodium carbonate peroxide to penetrate between the fibers.

Comparative Example A

This Example compares the use of sodium carbonate peroxide (Inventive Runs 11, 12 and 13) and hydrogen peroxide (Comparative Runs 11-C, 12-C, and 13-C) solutions to desize sized glass fabric.

A sample of commercially sized plain weave glass fabric containing 1.9% modified cornstarch and polyvinyl alcohol as the sizing material was treated according to Example 1 in the absence of a pretreatment step. The aqueous desizing solution contained various amounts of sodium carbonate peroxide or equal molar amounts of sodium carbonate and hydrogen peroxide as set forth in Table III and 1 g/l nonionic wetting agent. The results are set forth in Table III.

Table III demonstrates that desizing solutions containing small amounts of sodium carbonate peroxide are significantly more effective in removing sizing materials from glass fabric than hydrogen peroxide desizing solutions having an equivalent amount of hydrogen peroxide and sodium carbonate.

The invention being thus described, it will be obvious that the same may be varied in many ways. Such variations are not to be regarded as a departure from the spirit and scope of the invention and all such modifications are intended to be included within the scope of the following claims.

TABLE 1

| RUN No. | Pretreatment | Desizing Solution g/l $2Na_2CO_3 \cdot 3H_2O_2$ | %[1] owf | Residual Size, % Fabric Pieces Tested | | | | | |
|---|---|---|---|---|---|---|---|---|---|
| | | | | 1 | 2 | 3 | 4 | 5 | 6 |
| 1 | Steam | 2.0 | 0.06 | 0.15 | 0.18 | | | | |
| 2 | Steam | 5.0 | 0.15 | 0.12 | 0.13 | 0.10 | 0.19 | | |
| 3 | None | 5.0 | 0.15 | 0.22 | 0.21 | 0.10 | 0.22 | 0.15 | 0.13 |
| 4 | Water | 5.0 | 0.15 | 0.15 | 0.11 | | | | |
| 5 | Steam | 7.5 | 0.23 | 0.15 | 0.13 | 0.20 | 0.16 | | |
| 6 | None | 7.5 | 0.23 | 0.20 | 0.10 | 0.28 | 0.10 | | |

TABLE I-continued

| RUN No. | Pretreatment | Desizing Solution g/l 2Na$_2$CO$_3$ . 3H$_2$O$_2$ | %$^1$ owf | Residual Size, % Fabric Pieces Tested | | | | | |
|---|---|---|---|---|---|---|---|---|---|
| | | | | 1 | 2 | 3 | 4 | 5 | 6 |
| 7 | Steam | 10.0 | 0.30 | 0.26 | 0.15 | 0.25 | 0.16 | | |
| 8 | None | 10.0 | 0.30 | 0.23 | 0.21 | 0.20 | 0.24 | 0.21 | 0.12 |

$^1$% owf refers to the weight percentage of sodium carbonate peroxide on the fabric based upon the weight of the fabric.

TABLE II

| Run No. | Fabric | Desizing Solution g/l 2Na$_2$CO$_3$ . 3H$_2$O$_2$ | % owf | Residual Size, % Fabric Pieces Tested | | | | Average |
|---|---|---|---|---|---|---|---|---|
| | | | | 1 | 2 | 3 | 4 | |
| 9 | A | 5.0 | 0.15 | 0.23 | 0.18 | 0.12 | 0.17 | 0.18 |
| 10 | B | 5.0 | 0.15 | 0.12 | 0.25 | 0.10 | 0.13 | 0.15 |
| 2 | C | 5.0 | 0.15 | 0.12 | 0.13 | 0.10 | 0.19 | 0.14 |

TABLE III

| Run No. | Desizing Solution, g/l g/l 2Na$_2$CO$_3$ . 3H$_2$O$_2$ | g/l H$_2$O$_2$ | % owf 2Na$_2$CO$_3$ . 3H$_2$O$_2$ | H$_2$O$_2$ | Residual Size, % Fabric pieces tested | | |
|---|---|---|---|---|---|---|---|
| | | | | | 1 | 2 | average |
| 11 | 2.5 | — | 0.075 (0.025% H$_2$O$_2$ basis) | — | 0.18 | 0.25 | 0.22 |
| 11-C | — | 0.8 | — | 0.025 | 0.34 | 0.14 | 0.24 |
| 12 | 5.0 | — | 0.15 (0.05% H$_2$O$_2$ basis) | — | 0.12 | 0.07 | 0.10 |
| 12-C | — | 1.6 | — | 0.05 | 0.24 | 0.19 | 0.22 |
| 13 | 10.0 | — | 0.30 (0.10% H$_2$O$_2$ basis) | — | 0.16 | 0.19 | 0.18 |
| 13-C | — | 3.2 | — | 0.1 | 0.24 | 0.21 | 0.23 |

What is claimed is:

1. A process for desizing glass fabric, which comprises:
    a. dampening sized glass fabric with an aqueous desizing solution having a pH of about 4 to about 10, at a temperature of about 10° C to about 70° C for about 1 second to about 120 seconds, wherein said desizing solution consist essentially of 1.0 to 18.0 g/l sodium carbonate peroxide to provide about 0.03% to about 0.50% sodium carbonate peroxide on the fabric based on the weight of the dry fabric being dampened;
    b. removing the dampened glass fabric from the aqueous desizing solution;
    c. heating and maintaining the dampened fabric at a temperature from 70° C to the boiling temperature of the solution on the fabric for about 5 seconds to about 240 seconds; and
    d. washing the fabric to remove the desizing solution and size.

2. The process of claim 1 wherein the aqueous desizing solution contains 3.5 to 10.0 g/l sodium carbonate peroxide to provide about 0.1% to about 0.3% sodium carbonate peroxide on the fabric based on the weight of the dry fabric being dampened.

3. The process of claim 1 wherein the aqueous desizing solution has a pH value of about 7 to about 9.

4. The process of claim 1 wherein the glass fabric is dampened with the aqueous desizing solution at a temperature of about 15° C to about 30° C for about 5 seconds to about 60 seconds.

5. The process of claim 1 which comprises pretreating the sized glass fabric with water or water saturated steam at a temperature of about 55° C to about 135° C for about 1 second to about 600 seconds prior to dampening the fabric with the aqueous desizing solution.

6. The process of claim 1 which comprises pretreating the sized glass fabric with water at temperatures of about 60° C to about 90° C for about 15 seconds to about 120 seconds prior to dampening the fabric with the aqueous desizing solution.

7. The process of claim 1 which comprises pretreating the sized glass fabric with water saturated steam at a temperature of at least 100° C for about 30 seconds to about 180 seconds prior to dampening the fabric with the aqueous desizing solution.

* * * * *